(12) United States Patent
Lau et al.

(10) Patent No.: US 9,715,483 B2
(45) Date of Patent: Jul. 25, 2017

(54) USER INTERFACE FOR TESTING AND ASSERTING UI ELEMENTS WITH NATURAL LANGUAGE INSTRUCTIONS

(75) Inventors: Tessa A. Lau, Mountain View, CA (US); Jalal U. Mahmud, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1073 days.

(21) Appl. No.: 12/883,352

(22) Filed: Sep. 16, 2010

(65) Prior Publication Data

US 2012/0072823 A1 Mar. 22, 2012

(51) Int. Cl.
| | | |
|---|---|---|
| *G06F 17/00* | (2006.01) | |
| *G06F 17/21* | (2006.01) | |
| *G06F 11/36* | (2006.01) | |
| *G06F 9/44* | (2006.01) | |
| *G06F 9/455* | (2006.01) | |
| *G06F 17/22* | (2006.01) | |
| *G06F 17/24* | (2006.01) | |

(52) U.S. Cl.
CPC ............. *G06F 17/212* (2013.01); *G06F 8/38* (2013.01); *G06F 9/45512* (2013.01); *G06F 11/3684* (2013.01); *G06F 8/311* (2013.01); *G06F 17/2247* (2013.01); *G06F 17/24* (2013.01)

(58) Field of Classification Search
CPC ..... G06F 17/212; G06F 17/2247; G06F 17/24
USPC ....... 715/200, 234, 237, 255, 273, 760, 762, 715/788
See application file for complete search history.

(56) References Cited

U.S. PATENT DOCUMENTS

| | | | |
|---|---|---|---|
| 5,600,789 A * | 2/1997 | Parker et al. | 714/38.11 |
| 6,698,012 B1 | 2/2004 | Kossatchev et al. | |
| 7,055,137 B2 | 5/2006 | Mathews | |
| 7,080,118 B2 * | 7/2006 | Hildebrand | G06F 17/3089 707/E17.116 |
| 7,272,822 B1 | 9/2007 | Riggins et al. | |
| 7,324,912 B2 | 1/2008 | Gygi et al. | |
| 7,373,597 B2 * | 5/2008 | Hagerty | G06F 17/218 715/205 |
| 7,392,509 B2 | 6/2008 | Sinha et al. | |
| 2002/0194223 A1 * | 12/2002 | Meyers | G06F 17/271 715/234 |
| 2003/0023674 A1 * | 1/2003 | Hildebrand | G06F 17/3089 709/203 |
| 2003/0101255 A1 * | 5/2003 | Green | G06F 11/2294 709/223 |

(Continued)

FOREIGN PATENT DOCUMENTS

WO WO 9414122 A1 * 6/1994

OTHER PUBLICATIONS

Permadi, "Changing Button's Text", 2002, Permadi.com, 2pgs http://www.permadi.com/tutorial/jsInnerHTMLDOM/index.html.*

(Continued)

*Primary Examiner* — Cesar Paula
*Assistant Examiner* — David Faber
(74) *Attorney, Agent, or Firm* — Shimokaji IP

(57) ABSTRACT

A method, a system, and a computer medium for testing may be provided. An instruction including a natural language assertion statement may be received. The instruction may be parsed. The natural language assertion statement may be evaluated to true or false.

19 Claims, 6 Drawing Sheets

(56) References Cited

U.S. PATENT DOCUMENTS

| | | | | |
|---|---|---|---|---|
| 2004/0249979 A1* | 12/2004 | Yamaguchi | ........ | H04N 1/00291 709/246 |
| 2006/0136191 A1* | 6/2006 | Irons | ................... | G06F 9/45512 703/24 |
| 2006/0156287 A1 | 7/2006 | Vikram | | |
| 2006/0247907 A1* | 11/2006 | Qadeer | ............... | G06F 11/3608 703/22 |
| 2006/0282771 A1* | 12/2006 | Vinci | .................. | G06F 17/2725 715/209 |
| 2008/0086627 A1* | 4/2008 | Splaine et al. | ................ | 712/227 |
| 2008/0127103 A1 | 5/2008 | Bak | | |
| 2008/0244523 A1 | 10/2008 | Kelso | | |
| 2010/0083151 A1* | 4/2010 | Lanza | ............... | G06F 17/30976 715/764 |
| 2011/0239104 A1* | 9/2011 | Prasad | ................ | G06F 11/3684 715/234 |
| 2011/0276944 A1* | 11/2011 | Bergman | ............ | G06F 11/3684 717/124 |

OTHER PUBLICATIONS

Manning, Scott, "Conditional Formatting in Excel", Scottmanning. com Apr. 21, 2003, 4 pages.*
Visual J# Developer Center, "java.lang.String.startsWith(String prefix)", Visual J# Developer Center, online early as Oct. 28, 2008, 1 page http://web.archive.org/web/20081028224949/http://msdn. microsoft.com/en-us/library/aa988575(VS.80).aspx.*
Tao Wu, Yanling Wan, Yishan Xi, and Chuanbo Chen, "Study on the automatic test framework based on three-tier data driven mechanism", 2009 Eighth IEEE/ACIS International Conference on Computer and Information Science, 2009, pp. 996-1001.
Jacques Philippe Sauvé, Osório Lopes Abath Neto, Walfredo Cirne, "EasyAccept: A Tool to Easily Create, Run and Drive Development with Automated Acceptance Tests", Shanghai, China, 2006, pp. 111-117.
Avik Sinha and Carol Smidts, "HOTTest: A Model-Based Test Design Technique for Enhanced Testing of Domain-Specific Applications", ACM Transactions on Software Engineering and Methodology, vol. 15, No. 3, Jul. 2006, pp. 242-278.
David M. Hilbert and David F. Redmiles, "Extracting Usability Information from User Interface Events", ACM Computing Surveys, vol. 32, No. 4, Dec. 2000, pp. 384-421.
Eric Horvitz, "Principles of Mixed-Initiative User Interfaces", CHI, Pittsburgh, Pennsylvania, USA, 1999, pp. 159-166.
Michael Bolin, Matthew Webber, Philip Rha, Tom Wilson, and Robert C. Miller, "Automation and Customization of Rendered Web Pages", Seattle, WA, USA, 2005, 163-172.
Greg Little and Robert C. Miller, "Translating Keyword Commands into Executable Code", ACM, Montreux, Switzerland, 2006, pp. 135-144.
Nigel McFarlane, "Fixing Web Sites with GreaseMonkey", Linux Journal, vol. 2005, Issue 138, Oct. 2005, p. 1.

* cited by examiner

CoTester

Record | Step | Save | Cancel

Check - Pay Parking Tickets website (with assert)

* assert there is an element containing "By using this interface"
* assert there is a link that contains "Parking"
* assert there is a link labelled "Parking Meters" ← 615
* assert there is a link
* assert there is no treeview
* assert there is a button
* enter "0000000000" into the "Ticket #1:" textbox
* click the "Continue" button
* turn on the checkbox
* assert there is a checkbox
* click the "Continue" button
* assert there is a radiobutton
* assert there is a listbox labelled "Expiration Year:"
* turn on the first radiobutton
* assert there is a textbox
* enter "1234567123456" into the "Credit Card Number:" textbox
* select "12" from the "Expiration Month:" listbox
* assert there is a listbox
* select "2009" from the "Expiration Year:" listbox
* enter "123" into the "Credit Card Identification Number: (What is this?)" textbox
* enter "xxxxxx" into the "Card Holder's Name: (As It Appears On The Card)" textbox

---

PARKING

-- PLEASE READ THIS CAREFULLY --

The most commonly used browsers are supported browsers for this interface.

☐ Auto Booted
☐ Violation
☐ Parking Meters
☐ Vehicle Impounded
☐ City Parking Lots
☐ Residential Permits
☐ License Suspension
☐ Abandoned Vehicles
☐ Contest A Ticket
☐ Ticket Copies
☐ Vehicle Stickers
☐ Auto Towed
☐ Corporate Vehicles

*Enter Ticket Numbers*

Please enter the ten (10) digit ticket number for each ticket you wish to pay. The ten (10) digit ticket number includes any leading zeros. (where is my ticket number located?)

Ticket#1: [ ]  Ticket#2: [ ]  Ticket#3: [ ]  Ticket#4: [ ]
Ticket#5: [ ]  Ticket#6: [ ]  Ticket#7: [ ]  Ticket#8: [ ]

[Continue] [Reset All Information]

USER INTERFACE FOR TESTING AND ASSERTING UI ELEMENTS WITH NATURAL LANGUAGE INSTRUCTIONS

BACKGROUND

The present invention relates to natural language scripting, and more specifically, to natural language assertion statements for user interface testing of web pages and computer applications.

Currently, various testing tools running on a computer may provide to users testing computer application user interfaces the ability to record test scripts and to visually specify assertion points. For example, Rational Functional Tester may include computer implemented methods that may allow testers to record test scripts by running on a computer the user interface to be tested and visually selecting verification points (i.e. assertions).

However, the resultant test scripts produced by the various testing tools are generally made up of instructions that are programming language statements. Such programming language statements may not be readily understandable, editable, and sharable by non-programmers. Thus, the test scripts produced by current testing tools may become a major barrier for non-programmers who want to be able to understand and to modify test scripts for their own uses.

As can be seen, there is a need to provide non-programmers with the ability to more easily understand and to modify test scripts to test user interfaces.

BRIEF SUMMARY

In one aspect of the present invention, a method for testing may comprise the following machine-implemented steps of receiving an instruction including a natural language assertion statement, parsing the instruction, and evaluating the natural language assertion statement to true or false.

In another aspect of the present invention, a natural language scripting system may comprise a script parsing module machine-operable to parse an instruction including a natural language assertion statement that specifies a property within a graphical user interface for testing, a model interaction module operable to analyze a model describing elements of the graphical user interface, and an assertion evaluation module operable to evaluate the natural language assertion statement to true or false based on analysis of the model.

In a further aspect of the present invention, a non-transitory computer readable storage medium having computer readable code embodied therewith, the computer readable code may comprise code to receive a natural language instruction including a condition and an indication of a user interface element of a computer application, code to parse the instruction to determine the user interface element, and code to determine whether the user interface element meets the condition.

These and other features, aspects and advantages of the present invention will become better understood with reference to the following drawings, description and claims.

BRIEF DESCRIPTION OF THE SEVERAL VIEWS OF THE DRAWINGS

FIG. 5 shows a user interface of a web browser after evaluation of an assertion statement in accordance with various embodiments of the present invention; and FIG. 6 shows a user interface of a web browser after evaluation of another assertion statement in accordance with various embodiments of the present invention.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention may generally provide a natural language scripting system that allows for assertion statements to be written using language understandable by non-programmers. The assertion statements may also include natural language identification of elements within graphical user interfaces of computer applications, such as graphical user interfaces described by HyperText Markup Language files, that are targeted by the assertion statements.

Figure 1:
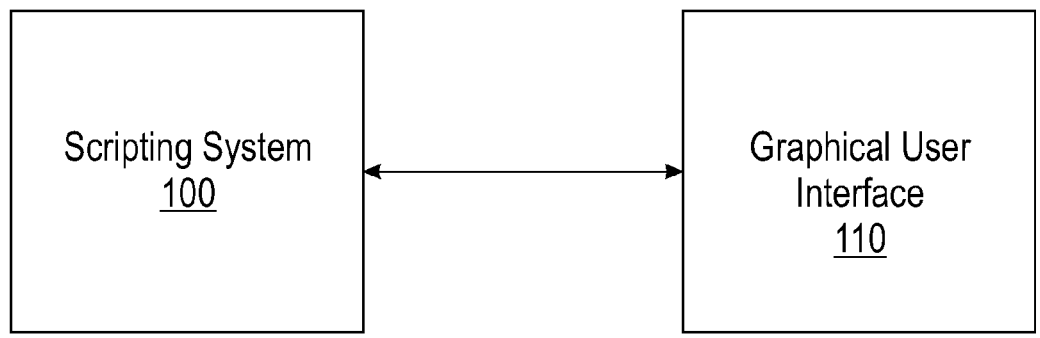
FIG. 1 shows a diagram of interactions between a scripting system and a computer program in accordance with various embodiments of the present invention.

With reference to FIG. 1, a scripting system 100 may be a machine-implemented (e.g., computer-implemented) natural language scripting system that may record and store scripts as natural language and may also interpret and run scripts written in natural language. During running of the scripting system 100, the scripting system 100 may communicate with a graphical user interface 110 of a computer program. For example, the scripting system 100 may record user interactions with the graphical user interface 110 so that the user interactions may be saved in natural language as a script. Alternatively, the scripting system 100 may playback a script written in natural language to control and interact with the graphical user interface 110 according to the instructions contained within the script, such as by automating user actions or by changing the state of elements within the graphical user interface 110.

Figure 2:
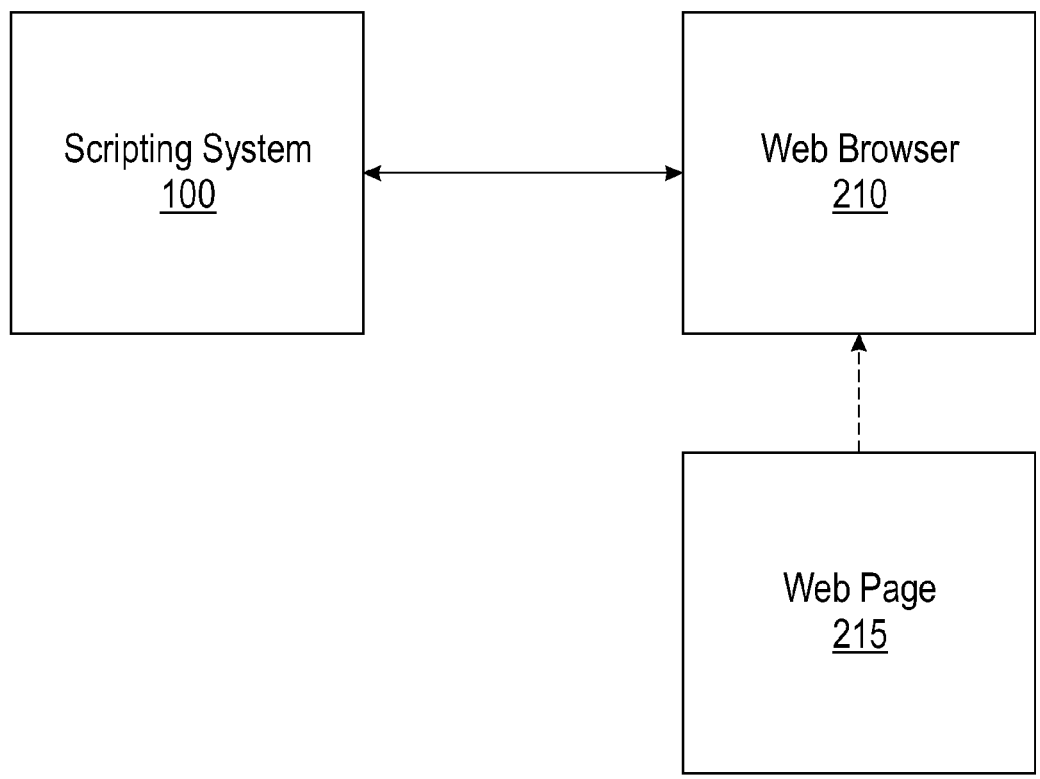
FIG. 2 shows a diagram of interactions between the scripting system of FIG. 1, a web browser, and a web page in accordance with various embodiments of the present invention.

With reference to FIG. 2, in accordance with various embodiments of the present invention, the scripting system 100 may interact with a graphical user interface of a web browser 210, such as Internet Explorer, Firefox, Chrome, Safari, Opera, or any other web browser, that may load and render a web page 215, such as HyperText Markup Language (HTML) files. The scripting system 100 may be implemented as a client-side extension for the web browser 210 in order to communicate with the web browser 210. The scripting system 100 may communicate with the web browser 210, such as by accessing the Document Object Model (DOM) of web pages 215 loaded on the web browser 210, in order to access information about GUI elements contained within a web page 215, as well as to add, modify, or delete elements within the web page 215.

In accordance with various embodiments of the present invention, the scripting system 100 may interact with the web browser 210 to test the user interface of a web page 215 loaded and rendered by the web browser 210. The scripting system 100 may accept and parse test scripts containing natural language instructions for testing the user interface of a web page 215 loaded by the web browser 210. Once the scripting system 100 parses the instructions contained within the test scripts, the scripting system 100 may interact with the web browser 210 to carry out the testing specified by the instructions.

The test scripts may include one or more natural language instructions that are assertion statements. In computer programming, an assertion may be a predicate (i.e., a statement whose truth or falsity is ascertainable) placed in a computer application to indicate that the predicate should always be true at that place in the application. For example, an assertion of x>5 may be placed in an application to indicate an assumption that the value contained in variable x will be bigger than 5 when the application reaches the assertion as it runs. Once the application reaches the predicate as it runs, the predicate may be checked to determine whether the predicate is true. If the predicate evaluates to true, the application may indicate that the assertion is successful. Conversely, if the predicate evaluates to false, the application may indicate that the assertion has failed.

The natural language assertion statements in the context of testing user interface elements may be predicates that may identify a target user interface element as well as certain characteristics or properties of the targeted user interface element, so that the targeted user interface element may be tested. For example, the natural language assertion statements may be used to test for the presence of certain user interface widgets, such as buttons, check boxes, and menu items, in a user interface. If the specified widget is found in the user interface being tested, the assertion might evaluate to true. Otherwise, the assertion might evaluate to false.

Because the assertion statements are written in natural language, the assertion statements may be understandable even by non-programmers, so that a non-programmer may be able to both read and edit test scripts containing natural language assertion statements, thereby reducing if not totally eliminating barriers for non-programmers to create and maintain test scripts.

The following table illustrates possible formats (amongst many) of natural language assertion statements along with examples of how the format may be used in constructing natural language assertion statements:

| Exemplary Format | Exemplary Usage |
| --- | --- |
| Assert there is a TARGET with label LABEL | Assert there is a "button" with label "click me" |
| Assert there is a TARGET | Assert there is a "textbox" |
| Assert there is a TARGET that contains TEXT | Assert there is an "Element" that contains "Please choose a menu" |
| Assert there is no TARGET that contains TEXT | Assert there is no "Element" that contains "Please choose a food" |
| Assert there is a TARGET that begins with TEXT | Assert there is an H1 element that begins with "Stock Price" |

As shown in the above table, a natural language assertion statement may start with the word "Assert" to indicate that the instruction is an assertion statement. A natural language assertion statement may then follow with a predicate also written in natural language that specifies a target, such as a GUI element in a computer application or on a web page. As shown above, user interface elements such as "button", "textbox", or "Element" may be specified as the target of the assertion statement. The target may also be more specifically identified by further specifying one or more characteristics or properties of the TARGET, such as by specifying a "button" with a specified label or by specifying an "Element" that contains specified text. As further shown in the above table, assertion statements may include both positive assertions, such as assertions that there is a target, and negative assertions, such as assertions that there is no target.

A non-exhaustive list of web page elements that may be the target of an assertion statement may include text, hyperlinks, images, videos, audios, embedded programs, buttons, check boxes, radio buttons, text boxes, list boxes, tree views, menus, text input, file select, hidden controls, object controls, forms, password input, labels, headers, HTML tags, and any other web page elements, tags, or content.

A non-exhaustive list of conditions and/or characteristics for targeted user interface elements being tested by the assertion statements may include that there is a target, that there is no target, that the target is visible, that the target is hidden, that the target is a specified value, that the target is labeled with a specified text, and that the target contains specified data.

Figure 3:
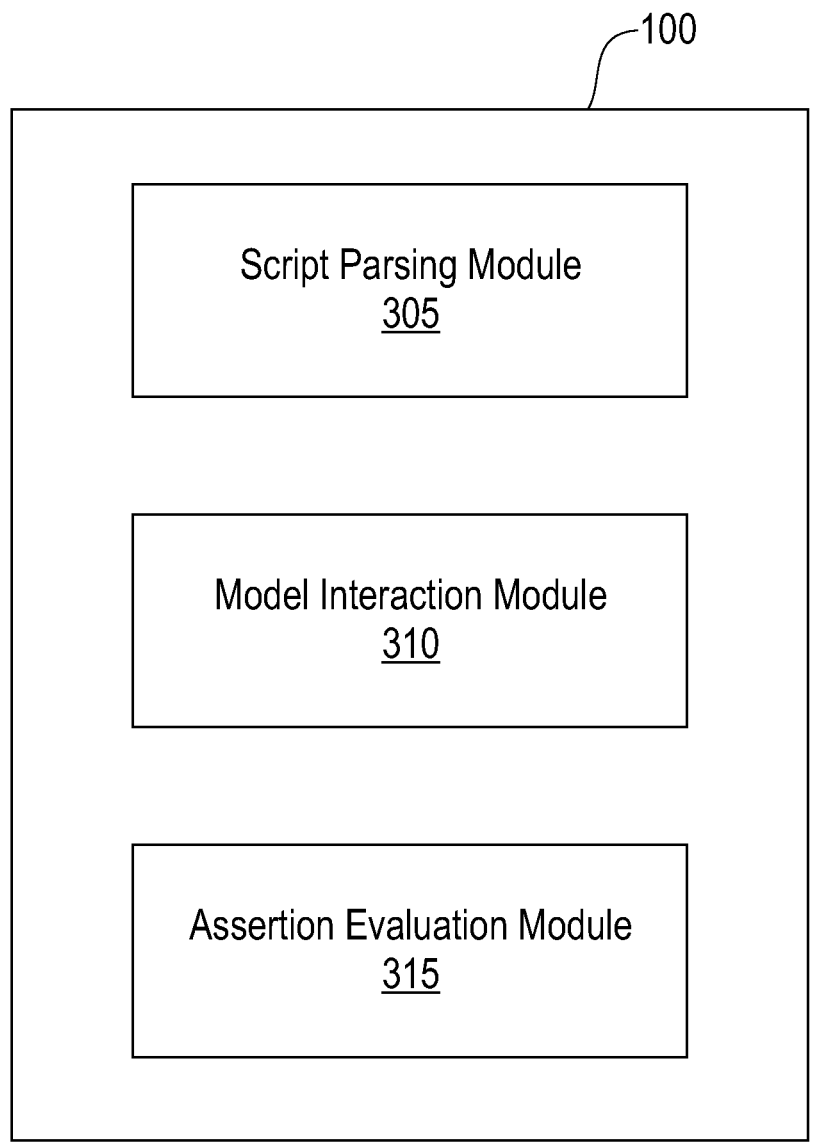
FIG. 3 shows a diagram of the modules included in the scripting system of FIG. 1 in accordance with various embodiments of the present invention.

With reference to FIG. 3, in accordance with various embodiments of the present invention, the scripting system 100 may include a Script Parsing Module 305, a Model Interaction Module 310, and an Assertion Evaluation Module 315.

The Script Parsing Module 305 may be operable to parse natural language instructions received and/or accepted by the scripting system 100, including natural language assertion statements that specify testing targets within a web page. The Model Interaction Module 310 may interact with a computer application, such as a web browser, to access a model of a graphical user interface, such as the DOM of a web page, to find the testing targets specified by the natural language assertion statements. Based on the results of the Model Interaction Module's 310 interactions with the DOM of the web page, the Assertion Evaluation Module 315 may evaluate the natural language assertion statements to true or false. For example, if the testing targets are found, the natural language assertion statements may evaluate to true.

Figure 4:
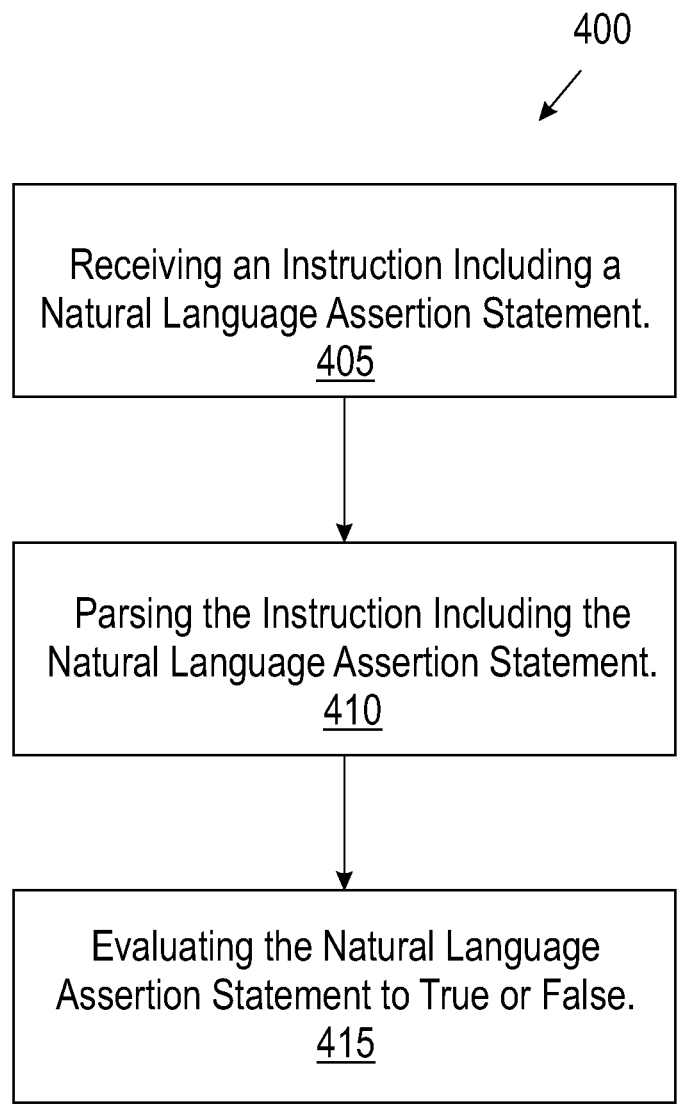
FIG. 4 shows a flowchart for natural language assertion statements in accordance with various embodiments of the present invention.

FIG. 4 shows a flowchart 400 for natural language assertion statements. At step 405, an instruction including a natural language assertion statement may be received. At step 410, the instruction including the natural language assertion statement may be parsed. In parsing the natural language assertion statement, a target element specified by the natural language assertion statement may be identified, along with any specified properties identifying the target element. At step 415, the natural language assertion statement may be evaluated to true or false. The evaluation of the natural language assertion statement may include accessing the DOM of the web page being tested. The DOM of the web page may contain information about elements of the web page, such as the state and/or condition of the target element. Thus, the evaluation of the natural language assertion statement to true or false may depend on the information included by the DOM of the web page.

Figure 5:
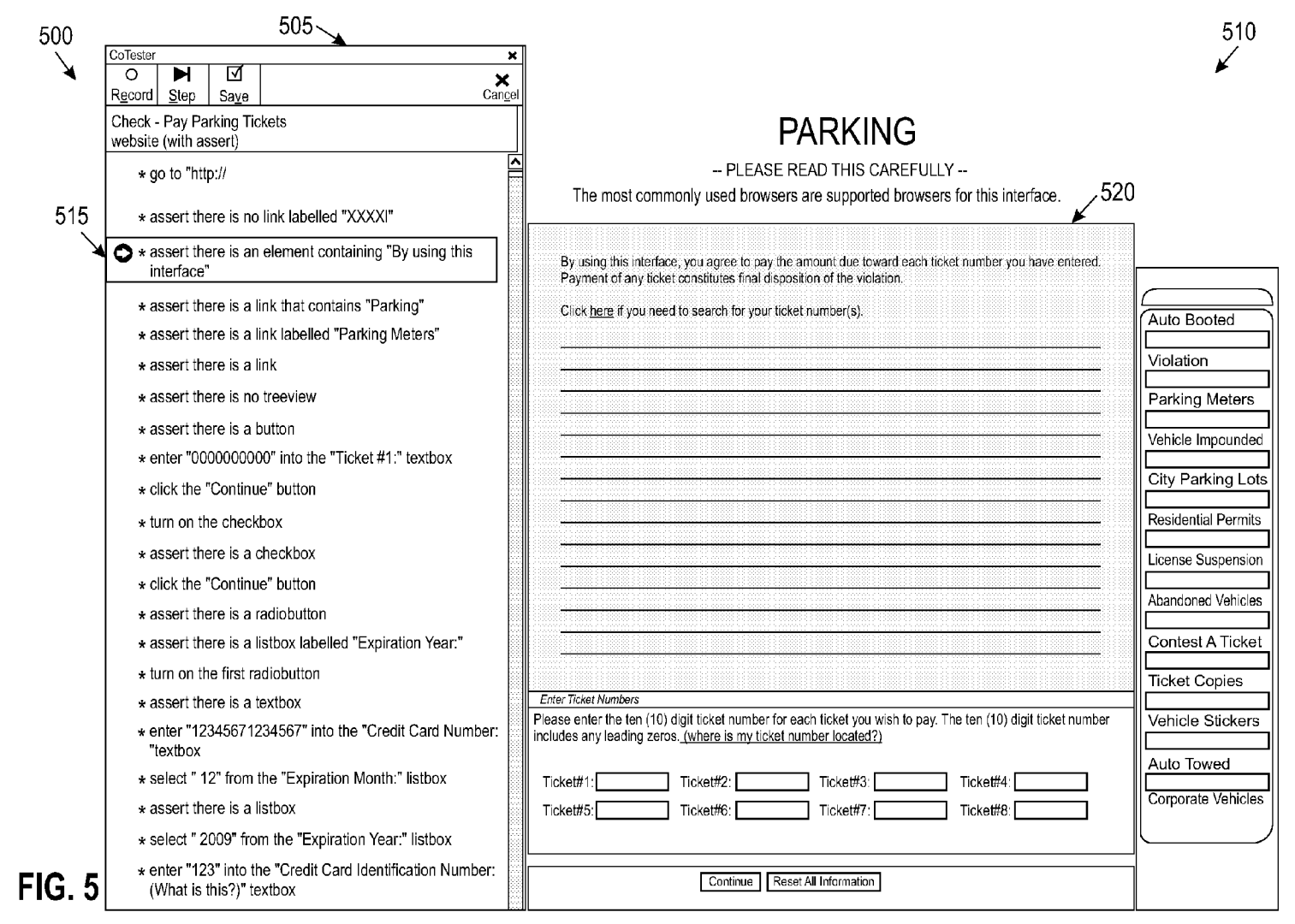

With reference to FIG. 5, a user interface 500 of the web browser 210 may include a first section 505 that displays an interface for the scripting system 100 and a second section 510 that displays a web page 215. The web page 215 displayed in the second section 510 may be accessed by the web browser 210 through a network, such as the Internet, or may be stored locally. The first section 505 displaying the interface for the scripting system 100 may display the instructions of a script loaded by the scripting system 100.

The script loaded by the scripting system 100 may include an assertion statement 515 that identifies an element in the web page 215 displayed in the second section 510 of the user interface 500. When the scripting system 100 reaches the assertion statement 515, the scripting system 100 may parse the assertion statement 515 and may access and analyze the DOM of the web page 215 to find the element identified in the assertion statement 515. If the predicate in the assertion statement 515 evaluates to true, such as by the scripting system 100 finding the element identified in the assertion statement 515 in the DOM of the web page 215, the scripting system 100 may provide an indication that the assertion statement 515 is true, such as by causing the graphical user interface 110 to highlight the identified element 520 on the web page displayed in the second section 510 as well as by highlighting the assertion statement 515 with a green border.

With reference to FIG. 6, if the predicate in an assertion statement 615 evaluates to false, the scripting system 100 may provide an indication that the assertion statement 615 is false. For example, the assertion statement 615 may be highlighted with a red border to indicate that the assertion statement 615 is false, and no content within the displayed web page 215 may be highlighted because the target of the assertion statement 615 was not found in the web page 215.

Figure 7:
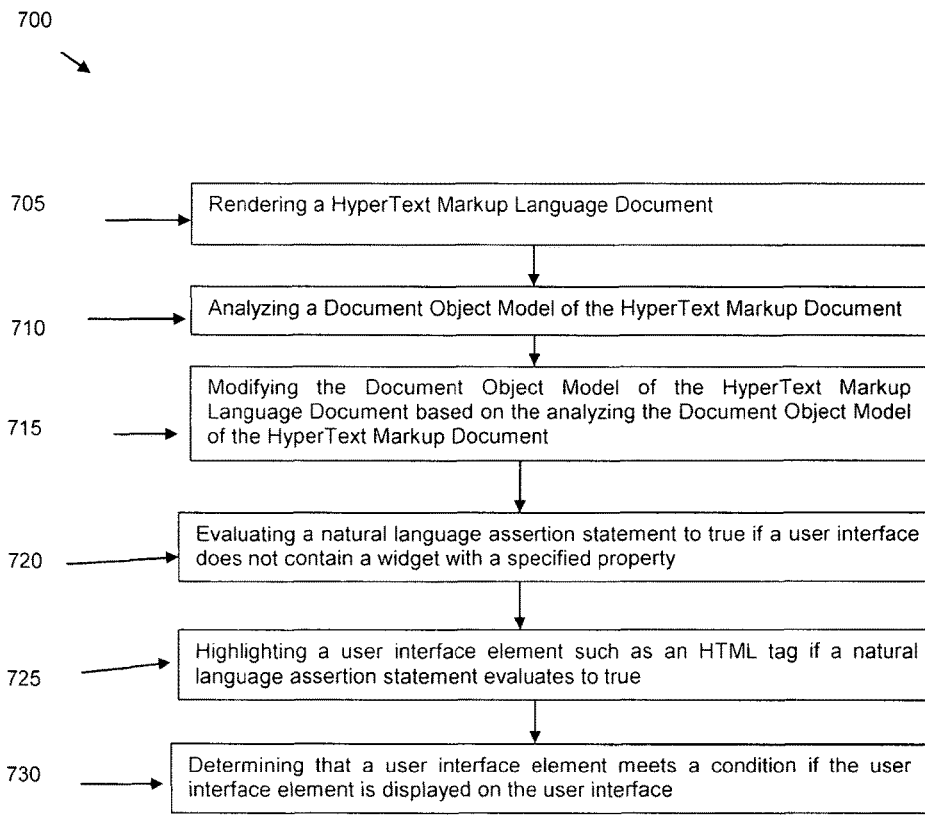
FIG. 7 shows a flowchart for handling natural language assertion statements in accordance with various embodiments of the present invention.

FIG. 7 shows a flowchart 700 for handling natural language assertion statements. A step 705 may include rendering a web page from a Hypertext Markup Language Document. A step 710 may include analyzing a Document Object Model (DOM) of the Hypertext Markup Document. A step 715 may include modifying the Document Object Model of the Hypertext Markup Language Document based on the analyzing of the Document Object Model of the Hypertext Markup Document. A step 720 may include evaluating a natural language assertion statement, for example, to true if a user interface with respect to the Document Object Model does not contain a widget with a specified property. A step 725 may include highlighting a user interface element such as a Hypertext Markup Language (HTML) tag if, for example, the natural language assertion statement evaluates to true. A step 730 may include determining that a user interface element meets a condition if, for example, the user interface element is displayed on the user interface.

Although embodiments of the present invention are discussed in the context of testing web page elements, natural language assertion statements may also be used in various embodiments of the present invention to test elements of user interface elements of computer programs outside of web pages and web browsers. For example, natural language assertions may be used to test elements of other structured documents or used to test the user interfaces of other computer applications.

Although assertion statements are well known in the art, assertion statements are primarily used by computer programmers in the process of writing a computer application. Therefore, there may not have been any awareness that non-programmers may also find assertion statements to be useful. Further, while natural language scripting languages are well known in the art, special challenges may also need to be addressed when adapting assertion statements as part of a natural language scripting system, such as making sure that the format of a natural language assertion statement is clear and understandable to non-programmers while also ensuring that a natural language assertion statement maintains enough power and flexibility to be useful in a wide variety of situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which runs via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which runs on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A method for testing comprising the following machine-implemented steps:
   receiving a plurality of natural language instructions, each of the plurality of natural language instructions including a natural language statement, such that each of the plurality of natural language instructions identifies, via natural language, a user interface element and particular text in the user interface element within a user interface,
   parsing the plurality of natural language instructions, wherein the parsing of the natural language instructions includes:
      identifying a target element specified by the natural language instructions;
      identifying properties identifying the target element;
      evaluating the natural language instructions to true or false based on accessing a document object model of a web page with information that includes a state and condition of the target element;
   modifying a plurality of user interface elements by executing a plurality of natural language modification statements;
   wherein the plurality of natural language instructions make an assertion as to existence of one of the plurality of modified user interface elements in the user interface and to existence of a property of the one of the plurality of modified user interface elements,
   wherein at least one property of the one of the plurality of modified user interface elements includes an assertion of being greater than a value of a variable during execution of an application, and
   wherein the user interface is included in a web browser and includes a first section that displays a scripting system including the natural language instructions and a second section that displays the web page including the user interface elements,
   wherein the first section and the second section are completely displayed simultaneously side by side, and wherein the scripting system refers to elements on the web page, and
   wherein both the one of the plurality of modified user interface elements and the natural language instructions are highlighted with a specified color based upon an existence of the one of the plurality of modified user interface elements;

wherein the plurality of natural language instructions are displayed as a list, wherein the scripting system is configured to include buttons to record the plurality of natural language instructions, step to a listed one of the plurality of natural language instructions, and save one of the plurality of natural language instructions, and wherein the first section is divided into three separately bordered parts, with a first part including the buttons to record, step to, and save the natural language instructions, a second part includes a natural language description of the second section, and a third part includes a list of previously entered natural language instructions.

2. The method of claim 1, wherein each of said plurality of natural language instructions specifies a test for one of the user interface elements within the user interface.

3. The method of claim 2, wherein the user interface comprises a rendering of a HyperText Markup Language (HTML) document.

4. The method of claim 3, wherein the evaluating further comprises analyzing a Document Object Model (DOM) of the HTML document.

5. The method of claim 4, further comprising modifying the DOM of the HTML document based on a result of the evaluating.

6. The method of claim 2, wherein the test for one of the user interface elements tests whether the user interface contains a widget having a specified property.

7. The method of claim 6, wherein the widget is a button and the specified property is a text label.

8. The method of claim 6, wherein each of the plurality of natural language instructions evaluates to true if the user interface does not contain the widget having the specified property.

9. The method of claim 1, including indicating whether each of the plurality of natural language instructions evaluates to true or false.

10. The method of claim 9, wherein the indicating includes highlighting the user interface element.

11. A natural language scripting computer-implemented system comprising:
a hardware computer processor configured to parse a first script that includes a plurality of natural language statements that specify a particular text within a graphical user interface for testing;
the computer processor configured to analyze a model describing a plurality of user interface elements in the graphical user interface, wherein the model is a document object model of a web page;
the computer processor configured to modify the plurality of user interface elements in the graphical user interface by executing one of the plurality of natural language statements; and
the computer processor configured to evaluate one of the plurality of natural language statements to true or false based on analysis of the model,
wherein the plurality of natural language statements make an assertion as to existence of one of the plurality of modified user interface elements in the graphical user interface and to existence of a property of the one of the plurality of modified user interface elements,
wherein the one of the plurality of modified user interface elements is highlighted or not highlighted based on the existence of the one of the plurality of modified user interface elements, and the plurality of natural language statements are highlighted with a specified color based upon the existence of the one of the plurality of user interface elements, wherein the plurality of natural language statements are displayed as a scrollable list, and wherein the system is configured to include buttons to record the plurality of natural language statements, step to a listed assert statement in the list, and save one of the plurality of natural language statements, and cancel a current operation to record or step into the one of the plurality of natural language statements, wherein the graphical user interface is included in a web browser and includes a first section that displays a scripting system including the plurality of natural language statements and a second section that displays the web page including the plurality of user interface elements, wherein the first section and the second section are completely displayed simultaneously side by side, and wherein the scripting system refers to elements on the web page, wherein both the one of the plurality of modified user interface elements and the plurality of natural language statements are highlighted with a specified color based upon an existence of the one of the plurality of modified user interface elements, and wherein the first section is divided into three separately bordered parts, with a first part including the buttons to record, step to, and save the plurality of natural language statements, a second part includes a natural language description of the second section, and a third part includes a list of previously entered natural language statements.

12. The system of claim 11, wherein the graphical user interface is described by a HTML document and the model is a Document Object Model for the HTML document.

13. The system of claim 11, wherein one of the plurality of natural language statements specifies whether the one of the plurality of modified user interface elements contains the property.

14. The system of claim 12, wherein the one of the plurality of modified user interface elements is a HTML tag.

15. The system of claim 12, wherein the one of the plurality of modified user interface elements is a user interface widget.

16. The system of claim 15, wherein the user interface widget is a button and the property is a label.

17. The system of claim 12, wherein the one of the plurality of user interface elements is an area of the graphical user interface and the property is a textual description.

18. A non-transitory computer readable storage medium having computer readable code embodied therewith, the computer readable code being configured to:
receive a first natural language instruction including a condition and an identification of particular text within a first user interface element within a user interface of a computer application;
receive a second natural language instruction including identification of a lack of a second element within the user interface of the computer application;
receive a third natural language instruction including identification of a particular view;
parse the first natural language instruction to determine the first user interface element;
parse the second natural language instruction to determine the second user interface element;

parse the third natural language instruction to determine the particular view;
determine whether the particular view is displayed on the user interface of the computer application;
determine whether the first user interface element meets the condition; and
determine whether the second user interface element is absent from the user interface of the computer application, and highlighting the second natural language instruction in response to the second user interface element being absent from the user interface of the computer application;
wherein the user interface is part of a web browser and includes a first section that displays a scripting system including the first, second, and third natural language instructions and a second section that displays a web page including the first and second user interface elements,
wherein the first section and the second section are completely displayed simultaneously side by side, and wherein the scripting system refers to elements on the web page,
wherein the first, second, and third natural language instructions are displayed as a list, and
wherein the scripting system is configured to include buttons to record the first, second and third natural language instructions, step to a listed one of the first, second, and third natural language instructions, and save one of the first, second, or third natural language instructions,
wherein the first section is divided into three separately bordered parts, with a first part including the buttons to record, step to, and save the natural language instructions, a second part includes a natural language description of the second section, and a third part includes a list of previously entered natural language instructions.

19. The storage medium of claim 18, wherein the user interface element meets the condition if the first user interface element is displayed on the user interface of the computer application.

* * * * *